United States Patent Office 3,161,310
Patented Dec. 15, 1964

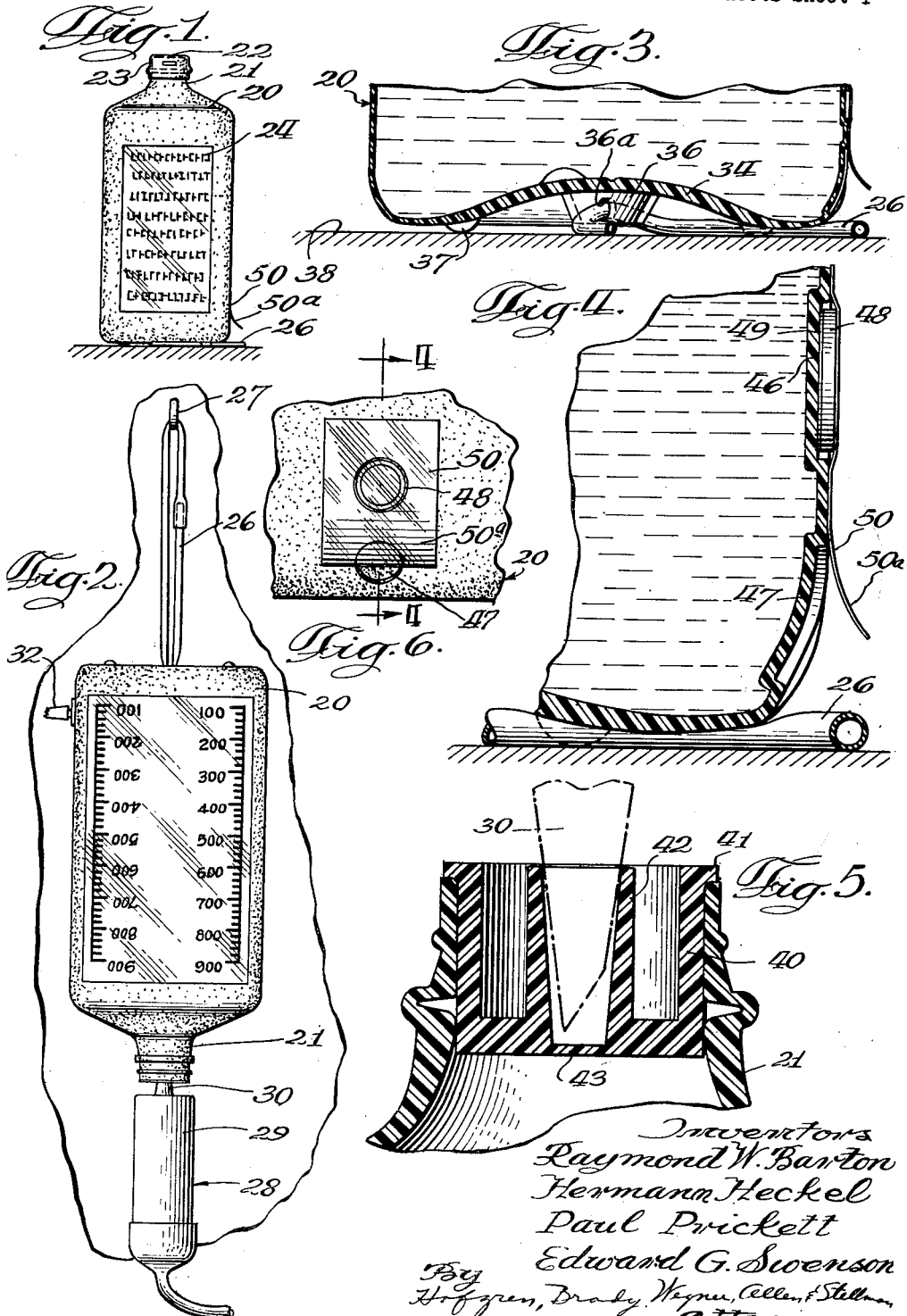

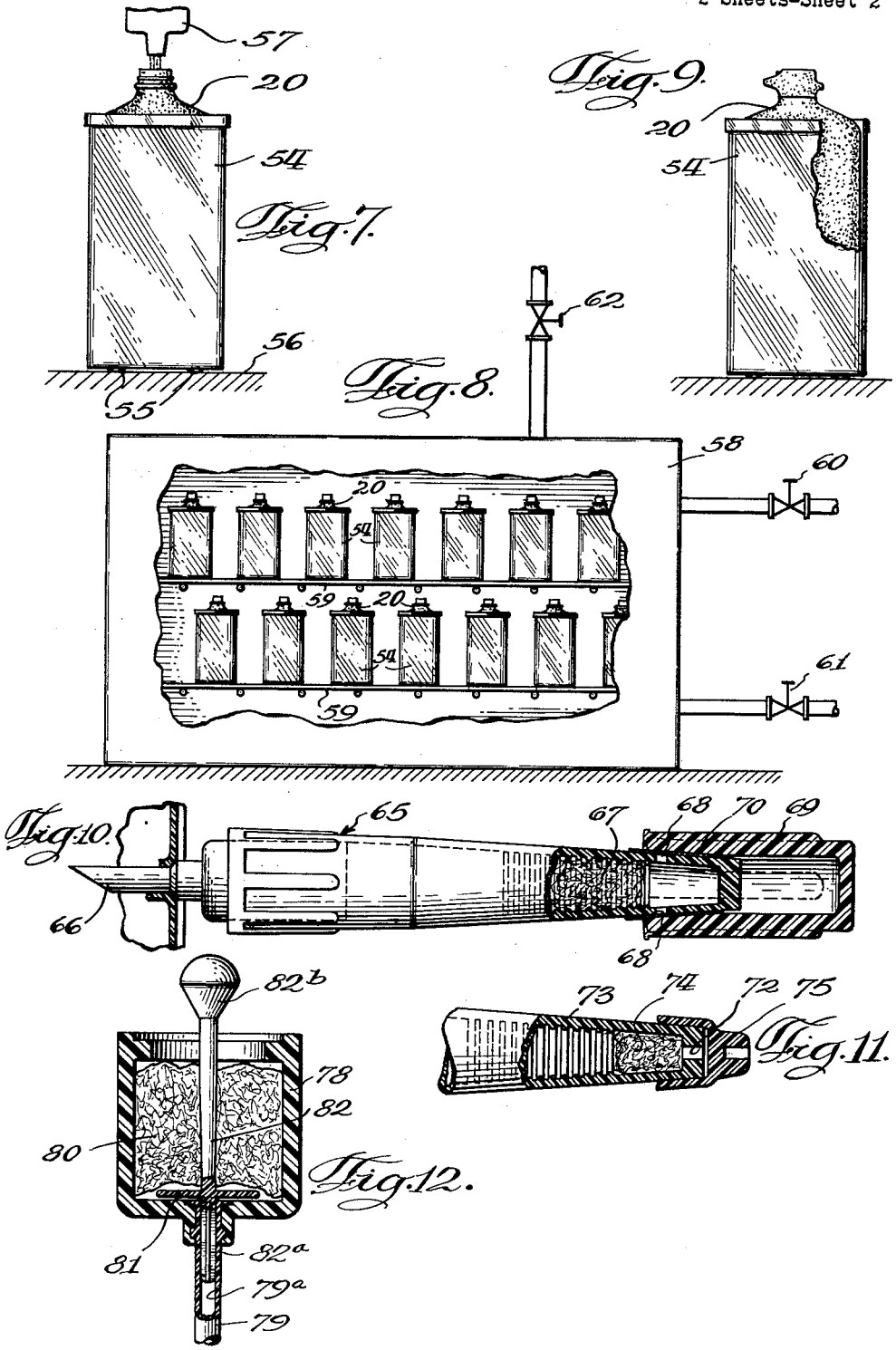

3,161,310
PARENTERAL SOLUTION CONTAINER
Raymond W. Barton, Evansville, Ind., Hermann Heckel, Oxford, Ohio, and Paul Prickett and Edward G. Swenson, Evansville, Ind., assignors, by mesne assignments, to Don Baxter, Inc., Glendale, Calif., a corporation of Nevada
Filed Oct. 14, 1960, Ser. No. 62,585
4 Claims. (Cl. 215—1)

This invention is concerned with a formed plastic parenteral solution container, a method of filling and sterilizing such containers and related apparatus.

Parenteral solutions, designed for infusion or intravenous feeding of patients have commonly been packaged in glass bottles of varying sizes. Glass bottles are quite heavy, relatively expensive, subject to breakage when mishandled and provide a disposal problem for the hospital, as they are not consumed by incineration.

Efforts have been made to provide plastic solution containers of synthetic plastic materials. Most of the work in this field has been concentrated on collapsible bags of plastic film materials, but this type of container presents several serious problems. A plastic bag is not self-supporting and if, as frequently happens, the administration of a solution must be interrupted to switch to blood, the administration apparatus is disconnected from the solution container and the remaining solution runs out. The lack of sufficient rigidity to be self-supporting makes filling extremely difficult; and in practice the containers are formed and filled simultaneously. Automatic machines for performing these operations are relatively slow as compared with bottle-filling machines, adding to the manufacturing costs. In addition, such containers must be heat sealed with liquid in them. It is difficult to make seals of this character with consistent quality in a production operation.

Another problem with plastic film containers is that water vapor escapes through the container walls. If the containers are stored for a period of time even as short as six to nine months, the concentration of the contents may be seriously increased.

A principal object of this invention is the provision of a molded plastic bottle having adequate strength and sufficient clarity to permit visual inspection of the contents and having a temperature characteristic allowing the use of heat sterilization, as in an autoclave.

One feature of the invention is the provision of a container particularly designed for parenteral solutions, including a bottle of blow-molded, intermediate density polyethylene plastic material; and preferably the bottle, which is partially deformable but not completely collapsible, has a first portion provided with a rupturable diaphragm for connection with an administration set and another portion provided with a resealable diaphragm for insertion of an air inlet device. Another feature of the invention is that the solution bottle is substantially completely filled with parenteral solution and has a minimum air space therein. As will appear, the substantially complete fill reduces the possibility of distortion of the container during sterilization.

A further feature is that the container has a panel of transparent tape adhesively secured to a wall thereof to improve the transmission of light therethrough, permitting visual inspection of the contents.

Still another feature of the invention is that the bottle has a recessed bottom portion with a centrally located depending tab, having an open space therearound between the tab and the peripheral portion of the bottle bottom. A suspension means for the bottle is attached to the tab and disposable within the open space surrounding the tab when the bottle rests on the surface. A further feature is that the suspension means for the bottle comprises a length of plastic tubing having its ends telescoped and sealed together.

Yet another feature of the invention is the provision of a bottle of molded plastic material having an indented area formed in the wall thereof with a pad of puncturable resealable material located in the indented area and a covering of a tape-like material overlying the pad and adhered to the adjacent container wall; and more specifically, first and second indented areas are formed adjacent each other with the end of the tape-like material extending partially over the second indented area to facilitate the removal of the tape.

And a further feature of the invention is the method of packaging a solution in a plastic container which comprises providing the container with a support, filling the container and sterilizing the supported container and contents at a temperature above the softening temperature of the plastic material. Another feature of the packaging method is that the container is substantially completely filled, minimizing the air space therein and reducing the possibility of distortion or deformation of the container during autoclaving.

A further feature of the invention is the method of applying a tape panel to the wall of the container which includes the step of warming the container to an elevated temperature and applying the tape panel at the elevated temperature, permitting the adhesive to fill the irregularities of the container surface. Still another feature is the step of wetting the surface of the container with an adhesive solvent before applying the tape, to cause the adhesive to conform intimately with the irregularities of the surface.

And a further feature of the invention is the provision of an air inlet filter device for a plastic parenteral solution container in which means are provided for preventing the solution wetting the filter material. More specifically, the filter device includes an elongated body with a cannula at one end for insertion into the container and a mass of filter material at the other end, remote from the cannula. In an alternative structure, the air inlet device includes a manually operable valve member between the cannula and the filter material.

Further features and advantages of the invention will be apparent from the following specification and from the drawings in which:

FIGURE 1 is an elevational view of a container embodying the invention;

FIGURE 2 is an elevational view of the container in use, with an infusion set connected thereto;

FIGURE 3 is an enlarged fragmentary sectional view of the lower portion of the container, illustrating the supporting arrangement;

FIGURE 4 is an enlarged fregmentary sectional view taken generally along the line 4—4 of FIGURE 6, illustrating the air intake resealable pad and its mounting;

FIGURE 5 is an enlarged fragmentary sectional view of the neck of the container and the closure therefor;

FIGURE 6 is a fragmentary elevational view of the resealable entry pad;

FIGURES 7-9 are diagrammatic views illustrating steps of the filling and sterilizing method according to the invention;

FIGURE 10 is an elevational view, partially in section, of an air inlet filter device for use with the plastic container;

FIGURE 11 is a fragmentary view, partially in section, of a modified air filter; and FIGURE 12 is a sectional view of another modified air filter.

Several basic requirements for parenteral solution containers must be met in adapting a plastic material for such use. One of the most important requirements relates to the ability to withstand elevated temperatures, for an extended period of time. Most parenteral solutions provide an excellent medium for bacterial growth, and must be sterilized in the final container unless the filling operation is carried on under sterile conditions, which is generally so difficult that it is economically unfeasible. Furthermore, the most practical sterilization procedure for parenteral products is to heat the filled containers to a temperature in excess of 220° F., and maintain it at the elevated temperature for a period, as of the order of one-half hour. Such an operation is normally carried on in an autoclave and is often referred to as "autoclaving." Accordingly, it is necessary that the plastic material used be such that it will not fail at this elevated temperature. This in itself is not too difficult to attain with the presently available plastics, such as the high density polyethylenes. However, another important requirement is that the container be such that the contents can be visually inspected before use, with sufficient clarity to permit observation of small particles, such as may be caused by formation of a precipitate in the solution. Hence, the material must permit relatively undiffused passage of light through the container walls.

In addition, the container must have sufficient strength to withstand hydrostatic shocks incurred during handling and shipment and must not be subject to stress failures during aging, as the products may be stored for some time before use.

A further requirement is that the plastic material shall not permit contamination of the contents over a period of time, either directly from the plastic itself, or by the slow diffusion or migration of air-borne contaminants through the container wall.

As pointed out above, high density polyethylenes provide the heat resistance required for autoclaving. However, they do not have sufficient clarity to permit visual inspection of the contents of the container. Certain polyvinyl plastics have the heat resistance and clarity which are required, but have been found to introduce contamination after a period of storage; and are relatively expensive.

A medium density polyethylene material, as Alathon 34, a product of E. I. du Pont de Nemours & Co., has been found satisfactory when the filling and processing are carried on in accordance with the invention.

Turning now to the drawings, a container 20 embodying the invention is illustrated in FIGURE 1. Container 20 is bottle-like in configuration, and has an opening defined by a neck 21 closed by a cap 22 which is in turn covered by a plastic film seal 23. The container or bottle 20 has a generally square cross-section with rounded corners for maximum strength with greatest economy of space for packaging and storage. In a one-liter size container, utilizing the medium density polyethylene material specified above, the thickness of the side panels of the container, which are the thinnest portion of the bottle, is of the order of 0.015 inch. This is the minimum thickness obtainable with present molding techniques to achieve a bottle with sufficient strength, particularly in the bottom portion thereof, to withstand the stresses of handling. A label 24 fixed to the side wall of the container 20 carries suitable identifying indicia for the parenteral solution, and also provides graduated scales indicating the quantity of solution in the container. Two reversely related scales are desirable, so that the quantity of solution may be determined whether the container is upright or inverted.

FIGURE 2 illustrates the container 20 as it is used in dispensing the solution. The container is hung in an inverted position by a supporting element or suspension member 26 from a suitable carrier 27, as a hook. An administration set 28 has a part 29 with a cannula or spike 30 which is inserted through an outlet in neck 21 of the container, for conducting the solution to a patient.

Air is admitted to the container 20 through a filter 32 suitably connected with the container, as will appear.

The suspension arrangement for the container is best seen in FIGURE 3. The bottom portion 34 of container 20 is formed inwardly defining a recess surrounded by a peripheral bottom portion 35. Centrally located in the recess is a diagonally extending depending tab 36, provided with an aperature 36a through which the suspension member 26 extends. A plurality of feet 37 are formed on the bottom of the peripheral portion of 35 of the container and hold the peripheral portion spaced from a supporting surface 38 on which the container may stand in an upright position. The downward extent of depending tab 36 is such that its lower extremity is spaced above the supporting surface. The suspension member 26 is received within the recess surrounding tab 36 and may extend outwardly between the peripheral bottom portion 35 of the container, between the feet 37, without interfering with the stability of the container.

The suspension member 26 preferably comprises a length of vinyl plastic tubing having its end portions telescoped and sealed together. The plastic tubing supporting element is extremely flexible and readily assumes such configuration or conformation as may be necessary to permit the container to stand in stead condition on a supporting surface. The supporting element normally has a generally circular configuration, when it is not acted on by an outside force, and, when the container is inverted, may readily be attached to a hanger. The support 26 is preferably assembled by threading a length of the plastic tubing material through the opening 36a in the tab, dipping one end in a solvent for the plastic and then telescoping the ends of the tubing. When the solvent evaporates, the ends are firmly welded together.

The neck 21 of container 20 is provided with a plug or fitment 40 which serves as a closure for the container and also provides for the connection thereto of a suitable administration apparatus. The plug is preferably of polyethylene material, and has an outwardly extending rim 41 which seats on the surface of the neck 21 of the container, properly positioning the plug in the neck. After insertion, the plug is heat sealed in place, bonding the interface between the inner surface of the neck and the outer wall surface of the plug. The plug is centrally recessed and is provided with an upstanding central tubular portion 42 closed at its inner end by an integral, rupturable diaphragm 43. The inner diameter of tubular portion 42 is such that it seals with the surface of the spike or cannula 30 of the administration set upon insertion thereof to a depth less than that sufficient to cause the pointed end portion to rupture the diaphragm. This prevents leakage of the contents during the attachment of the administration set.

Inasmuch as the container 20 is only slightly deformable or collapsible, it is necessary to provide for the entry of air to permit the contents to flow out through the administration set. A side wall of the container, adjacent the bottom thereof, is provided with a pair of indented or depressed areas 46 and 47, with the area 47 being adjacent to and directly below the area 46. A disc of resealing rubbery material, as a gum rubber, is affixed to the indented area 46 and provides for the insertion of the spike of an air inlet and filter device. The resealing disc 48 preferably has laminated thereto a layer of double-sided, pressure-sensitive, tape 49 having a polyvinyl ether adhesive which has been found to adhere satisfactorily to the plastic container wall. By "double-sided" is meant a tape which has a pressure-sensitive adhesive on both surfaces thereof. The tape 49 then serves as the means for securing the disc 48 to the container wall. The sterility of the disc 48 is maintained during handling and storage by a covering of tape 50 having a layer of adhesive on one side, which overlies the disc and is sealed to the wall of the container around the disc and indented area 46. An end portion 50a of the tape strip extends partially over the lower indented area 47 providing a readily manually engageable surface for grasping the tape to remove it.

The procedure followed in filling and sterilizing the container 20 is particularly important in permitting the practical utilization of polyethylene plastic material as the container. The preferred sequence of steps in the filling and the sterilizing operation are illustrated in FIG-URES 7–9. In FIGURE 7, the plastic container 20 is shown received in a supporting sleeve or canister 54 which conforms generally with the shape of the empty container and holds it during the filling and sterilizing operation. The container 20 preferably has a sliding fit inside the supporting canister 54. Supporting canister 54 is preferably of a reasonably rigid construction, as of sheet aluminum, and is provided with feet 55 which support the bottom in spaced relation from a supporting surface 56 to permit circulation of steam about the canister. A slot extends across the bottom of the canister to allow steam to enter and reach container 20. The slot is so located that diagonally extending tab 36 cannot enter it.

The empty container 20 is placed in the canister 54 and then filled, as from a suitable filling head 57. The parenteral solution is preferably delivered to container 20 at an elevated temperature, as of the order of 140°–190° F. This serves two functions: first, it reduces the quantity of dissolved gases in the parenteral liquid which might be driven off and stretch the bottle during autoclaving; and second, it reduces the time required to bring the filled containers to sterilization temperature in the autoclave. The container 20 is as nearly completely filled as possible, minimizing the quantity of air trapped therein. This reduces the danger of distortion of the container by high pressure gas when the plastic walls are softened during autoclaving. The filled container is provided with closure plug 40 which is sealed in place.

A quantity of the filled and supported containers 20 are then placed in an autoclave 58, FIGURE 8, in which they are held on spaced shelves 59. Steam is introduced into the autoclave, as through valve 60, at a temperature of the order of 230° F. for the medium density polyethylene material described above. This condition is maintained for a period of the order of thirty minutes to insure complete sterilization of the product. The temperature at which autoclaving is carried on requires a pressure of the order of 8–10 pounds per square inch. The sterilization temperature is in the range in which the plastic material softens and is readily deformable. The support provided by canister 54 and the absence of an excessive volume of air in the container reduce this problem.

Following the autoclaving period, the steam within the autoclave 58 is vented, and cooling water, as at a temperature of 190° F. introduced, as through valve 61. An over-riding air pressure of the order of 12–16 pounds per square inch is introduced into the autoclave through valve 62 before or concurrently with the venting of the steam. After the bottles are suitably cooled, they are removed from the autoclave 58, the upper surfaces of the plug sterilized and cap 22 applied.

The label 24 which carries identifying indica and graduations indicating the quantity of liquid in the container, serve further purposes. Molding procedures make it desirable to have a roughened surface on the container to facilitate removal from the mold. This surface irregularity diffuses light passing therethrough rendering impossible visual observation and inspection of the contents with the accuracy or clarity necessary. However, it has been found that if a layer of clear plastic material is adhered to the container surface, the clarity of the container is markedly increased. It is believed that the penetration of the adhesive on the tape into the irregularities of the surface of the blow-molded container reduces the diffraction or dispersion of light passing therethrough, and permits the required visual inspection. It is preferable that adhesive-coated panels be applied to opposite walls of the container, for maximum light transmission and clarity. The adhesive on the tape must be of sufficient thickness and have adequate flow characteristics to penetrate into the surface irregularities of the plastic material. The results are improved by applying the tape panels when the containers are warm or at elevated temperatures, permitting the adhesive to flow into the irregularities of the surface more freely; or by wetting the surface with an adhesive solvent, as alcohol or an alcohol-glycerine mixture, prior to the application of the panel. Transparent cellophane tape marketed by Minnesota Mining and Manufacturing Company under the trademark "Scotch" has been found satisfactory.

The indicia-bearing tape panels have the further beneficial effect of increasing the effective strength of the container, reducing the possibility of rupture during handling.

The air entry patch 48 and its covering tape strip 50 are preferably applied to the wall of the container prior to filling. The adhesive bond between the patch and the bottle wall is improved by the pressure applied thereto as a result of the weight of the container contents, while the container is confined within the sleeve 54, and at the same time heated to a point where the adhesive is intimately bonded with both the patch and the container wall.

For proper utilization of the resilient plastic parenteral container 20, a specially designed air inlet-filter device is desirable. When the spike of the air inlet is forced through the wall of the container, it requires the application of a substantial pressure on the container. The resulting deformation of the container places the contents under pressure and may force some of the contents into the air inlet device wetting the filtering medium and rendering it relatively unfit for use.

A novel air inlet and filter device construction is illustrated in FIGURE 10. The filter body 65 is elongated, and has a sharpened connula or spike 66 at one end thereof, for insertion through the wall of the container. The body 65 is elongated in a direction generally coaxially with the spike 66 and is provided at its outer end, remote from the spike, with a mass 67 of a suitable filtering material as sterile cotton. The spacing between the spike and filter material is preferably of the order of one inch. The outer end of the elongated filter body has a pair of air inlet holes 68 formed therein, and suitably closed prior to use as by a cap 69. If desired, a strip of adhesive-coated tape 70 may be affixed to the outer end of shoulder body 65, overlying the air inlet holes 68. The tape may be lifted up to permit air to flow into the holes and replaced at will, to control the entry of air into the container, and thus the administration of the parenteral solution.

A modified construction is shown in FIGURE 11 where the air inlet opening 72 is formed in the end wall of the filter body 73, immediately adjacent the filter material 74. A removable and replaceable rubber cap 75 is fitted over the end of the filter body to close the opening 72.

Still a further modification of the air inlet and filter device is illustrated in FIGURE 12. Here the filter body 78 has a cannula or spike portion 79 extending from the end wall thereof and filter material 80 is carried in the cup-like filter body. A valve member 81 is provided in the air inlet body and seats against the end wall from which the cannula projects. The valve is provided with a valve stem 82 having a portion 82a which extends into the bore 79a of the spike 79 serving as a guide for the movement of valve 81. The second portion 82b of the valve stem extends outwardly through the filter material 80 to permit manipulation of the valve. With the air filter and inlet of FIGURE 12, the spike is inserted through the wall of the container 20 with the valve 81 in closed position. This prevents any of the contents of the container from flowing outwardly and wetting the filter material. The valve 81 may then be opened by pulling outwardly on valve stem portion 82b, admitting air when it is desired to administer the solution.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A container of solution suitable for intravenous administration, comprising: a bottle being flexible but being sufficiently rigid to maintain its shape and to stand upright when filled with a liquid, said bottle having first and second indented areas formed in a side wall thereof adjacent each other, said indented areas extending inwardly from the outer surface of said bottle; a pad of a puncturable resealable material secured to the bottle wall in and substantially filling the first of said indented areas; and a covering of tape-like material overlying said pad and adhered to the wall of said container surrounding said first indented area, said tape having an end portion extending partially over said second indented area.

2. A container of solution suitable for intravenous administration, comprising: a polyethylene plastic bottle being partially deformable but being sufficiently rigid to maintain its shape and to stand upright when filled with a liquid, said bottle having an indented area formed in a side wall thereof; a pad of puncturable resealable material located in and substantially filling said indented area, said pad being on the outside of said rigid bottle; a double-faced, polyvinyl ether adhesive adhered to one surface of said pad and to the wall of said bottle within said indented area; and a covering of tape-like material overlying said pad and adhered to the side wall adjacent said indented area, said pad remaining attached to said bottle wall and being exposed upon removal of said tape-like covering.

3. A sealed container in combination with a solution therein for intravenous administration comprising: an elongated bottle of light-penetrable, intermediate density, polyethylene plastic material which normally includes irregularities opening into the outer surface and normally distorting accurate observation of the level of said solution in the bottle, said bottle being relatively flexible and being retained substantially rigid by said solution contained therein and maintained upright by said solution; and an elongated panel substantially the length of said bottle and secured to the outer surface thereof over a portion of said irregularities, said panel comprising a transparent tape having at least one indicia scale extending along the length of said tape and calibrated to ascertain the amount of solution in said bottle, said tape including a transparent adhesive filling the irregularities of said bottle and providing with said tape and bottle a uniform thickness whereby the solution level can be accurately determined by comparison with the indicia scale without distortion due to said irregularities.

4. A sealed container as claimed in claim 3 including a second indicia scale similar to said first mentioned indicia scale and disposed in an opposite direction with respect to said first mentioned indicia scale whereby the level of said solution can be readily compared with at least one of said scales depending upon the upright or inverted attitude of the bottle.

References Cited in the file of this patent

UNITED STATES PATENTS

| | | |
|---|---|---|
| 82,028 | Percival | Sept. 8, 1868 |
| 2,065,012 | Muleford | Dec. 22, 1936 |
| 2,128,652 | Kratz et al. | Aug. 30, 1938 |
| 2,294,574 | Ravenscroft et al. | Sept. 1, 1942 |
| 2,362,980 | Ball | Nov. 21, 1944 |
| 2,380,696 | James | July 31, 1945 |
| 2,438,149 | Cutter et al. | Mar. 23, 1948 |
| 2,507,684 | Smith | May 16, 1950 |
| 2,520,124 | Chaney | Aug. 29, 1950 |
| 2,559,284 | Dickschat | July 3, 1951 |
| 2,638,430 | Mann | May 12, 1953 |
| 2,660,513 | Ball | Nov. 24, 1953 |
| 2,699,103 | Stasikewich | Jan. 11, 1955 |
| 2,704,075 | Cherkin | Mar. 15, 1955 |
| 2,787,268 | Greenspan | Apr. 2, 1957 |
| 2,808,829 | Butler | Oct. 8, 1957 |
| 2,825,521 | Nesset | Mar. 4, 1958 |
| 2,835,623 | Vincent et al. | May 20, 1958 |
| 2,837,245 | Grebowiec | June 3, 1958 |
| 2,845,728 | Huber | Aug. 5, 1958 |
| 2,886,035 | Loutz | May 12, 1959 |
| 2,906,423 | Sandhage | Sept. 29, 1959 |
| 2,936,920 | Wallace | May 17, 1960 |
| 3,041,775 | Brown et al. | July 3, 1962 |
| 3,064,652 | Corcoran et al. | Nov. 20, 1962 |

FOREIGN PATENTS

| | | |
|---|---|---|
| 190,566 | Great Britain | Dec. 28, 1922 |

OTHER REFERENCES

Precocious Plastic, article in Modern Plastics, volume 25, pp. 73–80, February 1948.

Heat Sterilization in Plastics, article in Modern Packaging, pp. 165–167, September 1957.